United States Patent [19]

McGrath

[11] Patent Number: 5,954,421

[45] Date of Patent: Sep. 21, 1999

[54] FLUORESCENT TUBE REFLECTOR AND COVER

[76] Inventor: Spencer C. McGrath, 1215 Pin Oak, Guthrie, Okla. 73044

[21] Appl. No.: 08/617,372

[22] Filed: Mar. 18, 1996

[51] Int. Cl.$^6$ ....................................................... F21S 3/00

[52] U.S. Cl. .......................... 362/222; 362/223; 362/225; 362/374; 362/375

[58] Field of Search ........................... 362/217, 221–225, 362/260, 374, 375

[56] References Cited

U.S. PATENT DOCUMENTS

| | | | |
|---|---|---|---|
| 2,717,307 | 9/1955 | Bjontegard | 362/375 |
| 4,799,134 | 1/1989 | Pinch et al. | 362/217 |
| 5,207,504 | 5/1993 | Swift et al. | 362/260 |
| 5,440,466 | 8/1995 | Belisle et al. | 362/222 |

FOREIGN PATENT DOCUMENTS

| | | | |
|---|---|---|---|
| 2248277 | 4/1973 | Germany | 362/223 |

*Primary Examiner*—Alan Cariaso
*Attorney, Agent, or Firm*—Robert Treece

[57] ABSTRACT

A fluorescent lighting fixture having at least one elongated fluorescent light tube and a reflector having edges extending generally the length of the light tube. The reflector having a pair of concave reflective surfaces for each light tube, wherein the concave surfaces are separated by an apex generally aligned over each light tube. A cover is removably attached to the reflector's edges.

10 Claims, 3 Drawing Sheets

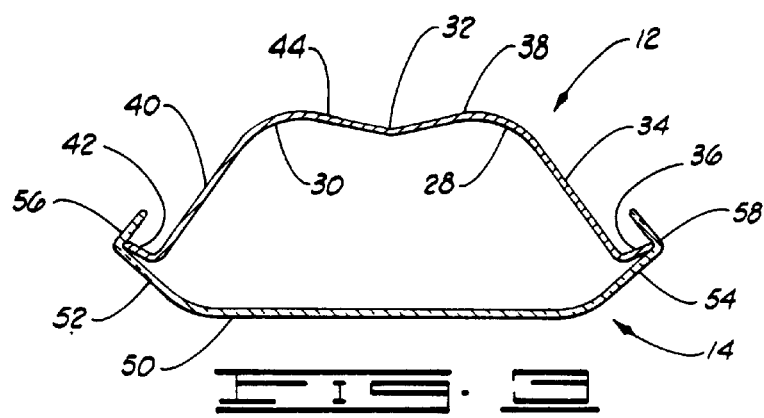
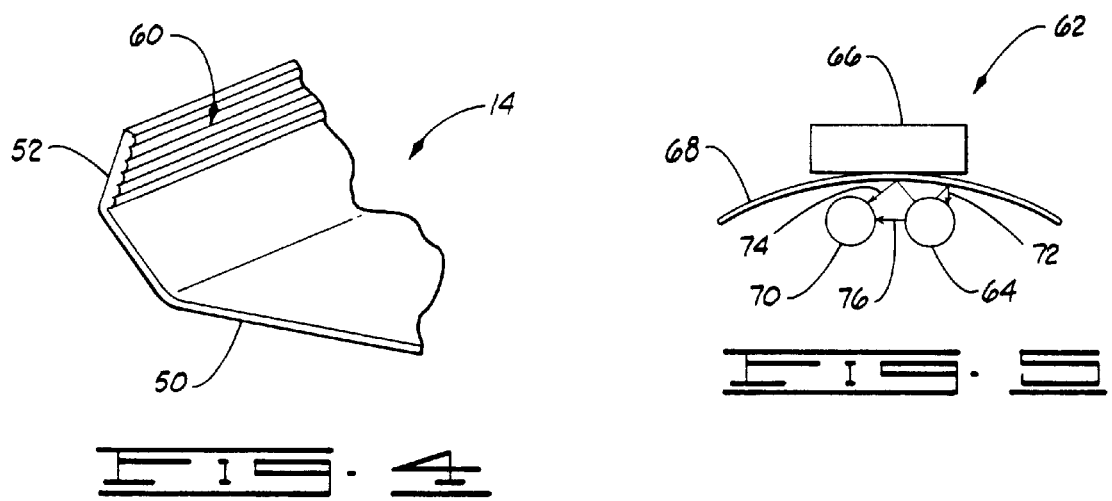
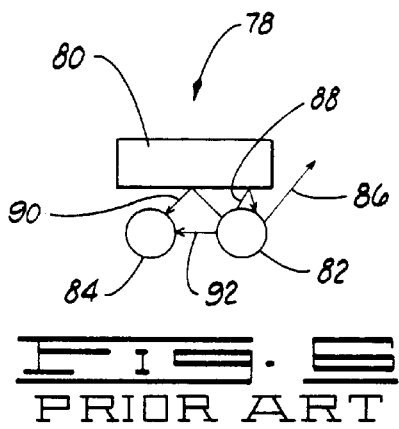
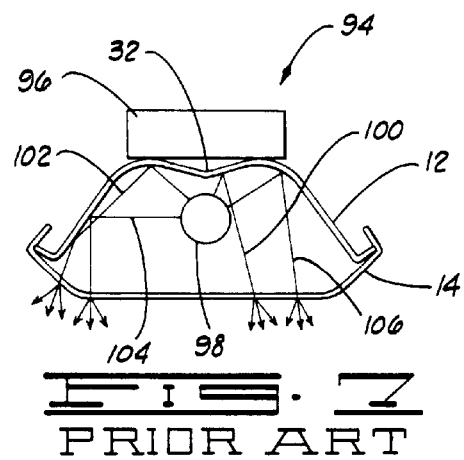

5,954,421

FLUORESCENT TUBE REFLECTOR AND COVER

FIELD OF THE INVENTION

The present invention relates to improved fluorescent lighting fixtures having one or more reflectors to enhance the lighting output.

SUMMARY OF THE INVENTION

In my prior invention, Now U.S. Pat. No. 4,799,134, I described how to increase the efficiency of a fluorescent lighting fixture which is enclosed in a housing. These fixtures are commonly called troffers. While invention was a great leap forward in increasing the efficiency of finished buildings having such light fixtures, many buildings use less expensive fixtures such as strips, or shop lights. As used herein, "strip lights," "strip fixtures," or just "strips" mean a light fixture having a generally rectangular base case with a pair of fluorescent tube bulbs suspended therefrom by connector pins at the opposite ends thereof. Similarly, "shop lights" mean the same type of fixture with a reflector connected between the base and the fluorescent bulbs.

Strip and shop lights have been commonly used since the fixtures are relatively inexpensive to purchase initially and a ceiling grid is not required to mount them. However, such lights are unattractive and inefficient. One problem with this type of light is that the light emitted by the bulbs is often misdirected so that it never reaches the area where the illumination is desired. This happens in several ways. For example, light emitted by a bulb may be reflected back into the same bulb, or emitted directly into the other bulb in the fixture, or the light may not be reflected at all and simply be emitted in a direction where no illumination is desired. In each of the examples above, light (and the energy required to create it) is wasted.

One object of the present invention is to provide an attractive, efficient fluorescent light fixture.

A second object of the present invention is to provide a method for converting an existing inefficient strip or shop light into an attractive, efficient fluorescent light fixture.

A third object of the present invention is to provide an improved reflector with a cover for attachment thereto.

Other objects, features and advantages of the present invention will become apparent from the following detailed description when read in conjunction with the accompanying drawings and appended claims.

BRIEF DESCRIPTION OF THE DRAWINGS

FIG. 3 is an end elevational view of the reflector and cover of FIG. 1.

FIG. 4 is an enlarged perspective view of a portion of the cover of FIG. 1.

FIG. 5 is an end elevational view of an existing shop light.

FIG. 6 is an end elevational view of an existing strip light.

FIG. 7 is an end elevational view of a fluorescent light fixture constructed in accordance with the present invention.

DETAILED DESCRIPTION OF THE PREFERRED EMBODIMENTS

Figure 1:
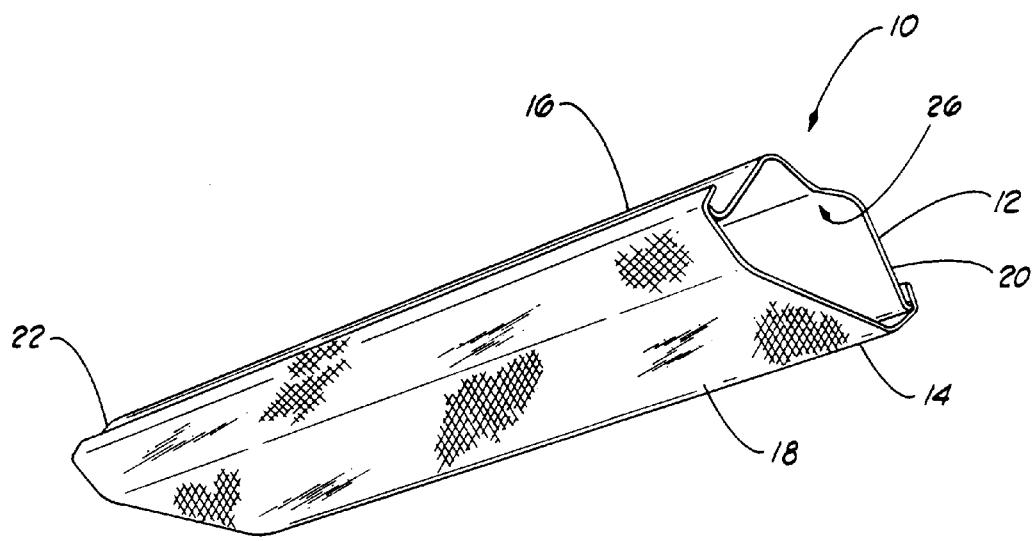
FIG. 1 is a perspective view of a reflector and cover for a fluorescent light fixture constructed in accordance with the present invention.

Referring to the drawings in detail and to FIG. 1 in particular, reference character 10 generally designates a reflector and cover assembly for a fluorescent light fixture constructed in accordance with the present invention. Reference character 12 designates the reflector, and reference character 14 designates the cover.

For the sake of clarity, the assembly 12 will be described as having a top and a bottom 18. However, while the assembly may be mounted as an overhead light fixture as shown, the fixture may also be mounted at an angle or on a wall. Thus, the designations top and bottom are only to identify relative locations of the various parts of the invention as depicted, and are not to be considered as an absolute position or as a limitation. Similarly, the assembly 12 will be described as having a front 20 and a rear 22, the front 20 being the end of the assembly 12 shown nearest to the reader in FIG. 1 and the rear being the end of the assembly 12, shown as away from the reader in FIG. 1. Since the assembly may be, and preferably is, symmetrical throughout its length from the front 20 to the rear 22, the designations of front and rear are simply for orientation of the parts and elements as shown in the figures, and are not included as a limitation.

The reflector 12 is preferably formed from a material which may be shaped, and then will generally hold its shape. The reflector 12 should have a highly reflective lower surface 26. While any generally shape sustaining material may be coated with a reflective lower surface, a durable material such as metal is preferred. As stated previously, the reflective lower surface 26 may be achieved by coating the material, but it is preferable to allow the metal itself to provide the reflective properties. The most preferred material is specular quality aluminum because it is light weight, strong, easy to shape, and is more resistant to oxidation than most metals. Of course a protective coating may also be applied to further protect the metal.

Figure 2:
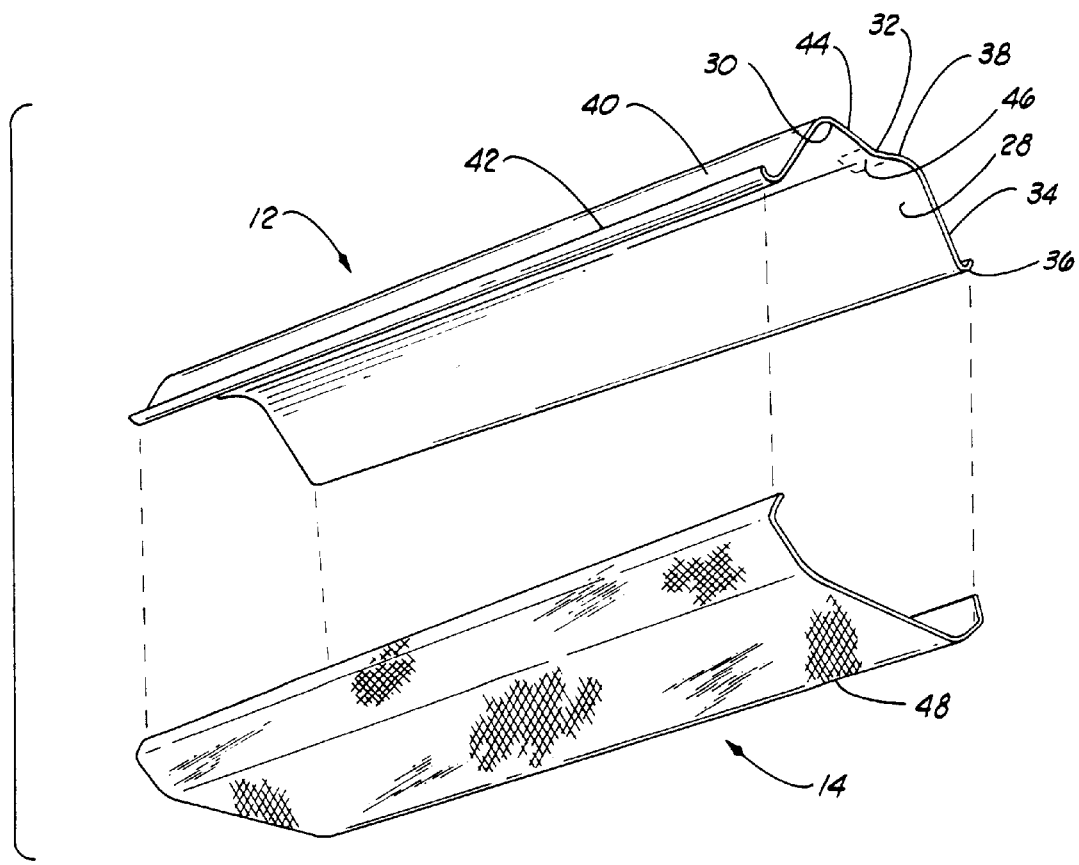
FIG. 2 is an exploded view of the reflector and cover of FIG. 1.

Referring now to FIGS. 2 and 3, the reflector 12 is formed from two of reflective surfaces 28 and 30, and separated by an apex 32. While the reflective surfaces 28 and 30 may be separate pieces joined or abutting at the apex 32, the surfaces are preferably integrally joined and, most preferably, made from a single piece of material. The surface 28 has a concave lower surface with a long leg 34 extending to the outer edge 36, and a short leg extending toward the apex 32. Similarly, the surface 30 has a concave lower surface with a long leg 40 extending to the outer edge 42, and a short leg extending toward the apex 32. The concave surfaces 28 and 30 preferably have smooth rounded bends creating the concavity to enhance the reflective characteristics of the reflector 12. The apex 32 is also preferably rounded. While a sharp bend at the apex may be desirable in some cases, it has been found that a slightly rounded bend reduces the likelihood that the metal will crack along the apex. With this configuration, the reflector forms a rounded M shape.

In the most preferred embodiment, the edges 36 and 42 of the reflector 12 are rolled, as seen in FIG. 2. In this way, the strength of the reflector is increased and reduces the likelihood of waves forming in the long legs 34 or 40. In addition, rolled edges 36 and 42 provide attachment points for the cover 14 as discussed below.

Preferably the length of the reflector 12 preferably generally corresponds with the length of the fluorescent light fixture, which is generally two feet or four feet long. Since the fixture is generally slightly longer than the length of the fluorescent tube it holds, it may be desirable to cut a notch (such as depicted by dashed line 46 in FIG. 2) in the reflector at the apex 23 to allow lamp holders to extend downwardly from the fixture past the reflector to hold, and electrically connect to, the fluorescent tubes. In this way, the reflector may extend the entire length of the fixture or even slightly further.

A press or break may be used to form the reflectors 12, but it has been found that it is preferable to use a roll former. By using a roll former to make the reflectors 12 virtually any length of reflector may be easily made, and a shear can be used to cut the reflector to the desired length either before or after rolling. However, the reflectors are preferably cut to length after being rolled. In this way, a continuous strip of material may be fed to a roll former and the rolled reflectors may be cut to length as they exit.

Preferably, a cover 14 is provided for removable attachment to the reflector 14. The cover 14 is preferably made from a durable transparent or translucent material which may be shaped when soft and then hardened to generally retain its shape. While it is possible to make a cover from a very rigid material such as glass, such is not preferred. This is because glass generally lacks the elasticity desirable when attaching the cover to the reflector and because glass is fragile and may break, showering individuals below the cover with pieces. The preferred material is a plastic or an acrylic polymer. Such materials are easy to shape by molding, extruding, or pressing under heat, and they will generally retain their shape at operating temperatures.

In the preferred embodiment, the cover 14 includes a texture (such as texture 48 shown in FIG. 2) to enhance its appearance and to soften the light. The softening of the light reduces glare which can be created by the fluorescent tube. One preferable texture is a plurality of pyramids or tetrahedrons formed on the bottom side of the cover 14.

The cover 14 has a center portion 50, outer portions 52 and 54, and edges 56 and 58. The center portion 50 may have virtually any geometric or irregular shape, but is preferably generally plainer. In contrast, the outer portions preferably extend generally upward, this does not restrict their shape to plainer, curved, or any other regular or irregular shape, but does allow the center to be positioned somewhat lower than the edges. The edges 56 and 58 preferably converge slightly toward each other. In this way, the edges 56 and 58 may be spread slightly to be placed over the outer edges 36 and 42 of the reflector, and the cover edges 56 and 58 may converge slightly to allow the cover to snap over or hold to the reflector's outer edges 36 and 42 to connect the cover 14 to the reflector 14.

As may be seen in FIG. 4, the inside of the outer edge 52 of the cover 14 preferably includes a plurality of ridges 60. The ridges 60 engage the outer edges 36 and 42 of the reflector 12 when the cover 14 is connected thereto, thus, providing a stronger connection between the cover 14 and the reflector 12.

FIG. 5 shows a conventional shop light 62 and how light produced by fluorescent tube 64 is lost or wasted. With a typical shop light such as light 62, a base 66 is mounted to or hung from a ceiling. A reflector 68 may be attached to the lower side of the base 66 and a pair of fluorescent tubes 64 and 70 are positioned below the reflector 68. The light emitted by the tube 64 is depicted in the form of photons, or particles of light traveling in a straight line (illustrated by arrows 72, 74, and 76). While the light's path is illustrated by a single arrow, it should be noted that a range of angles on either side of each arrow would produce the same result. In addition, these ranges would extend for the length of the tube. It should also be noted that light emitted by tube 70 would encounter similar problems further reducing the percentage of usable light from the fixture.

Light leaving tube 64 in the direction 72 would bounce off reflector 68 and return to the tube 64 where it would be reduced, scattered, absorbed or lost. Similarly, light leaving tube 64 in the direction 74 would bounce off reflector 68 and into tube 70 where it would also be wasted. In addition, light leaving tube 64 in the direction 76 would travel directly into tube 70 where it too would be lost.

An even worse scenario is shown in FIG. 6. A typical strip light 78 has a base 80 and a pair of fluorescent tubes 82 and 84 connected below the base 80. Arrows 86, 88, 90 and 92 illustrate light leaving tube 82 at the various indicated angles. Light leaving in the direction shown by arrow 88 would be reflected back into tube 82, and light leaving as shown by arrows 90 and 92 would collide with tube 84. In addition, a large portion of the light leaving tube 82 in or near the direction indicated by arrow 86 is wasted as it leaves in an upward direction traveling away from where it is needed.

FIG. 7 shows the direction of the travel of light when the reflector 12 and cover assembly 14 of the current invention is used. The fluorescent light fixture 94 shown includes a base 96 having a single fluorescent tube 98 connected therebelow. The reflector 12 is connected to the lower side of the base 96 and the fluorescent tube 98 is connected therebelow. The apex 32 of the reflector 12 is positioned so it is generally above the center of the tube 98.

Light traveling in the direction indicated by arrow 100 would bounce off reflector 12 and then downwardly in the desired direction where it would pass through cover 14. Upon passing through cover 14, the light would be softened and spread across the area where illumination is desired. As a comparison, arrow 72 in FIG. 5 and arrow 88 in FIG. 6 each show that without the reflector 12, light would be lost. Arrow 102 compares with arrows 74 and 90 in FIGS. 5 and 6, respectively, to show that the elimination of a second bulb and the use of the reflector 12 directs what would normally be lost light down where it is needed. Arrow 104 in FIG. 7 similarly compares with arrows 76 and 92 in FIGS. 5 and 6, respectively, also showing how normally lost light is redirected to the area of need. Finally arrow 106 compares with arrow 86 in FIG. 6 to show how light which would normally travel in the wrong direction is reflected down where it should be.

It has been found that the use of a single full spectrum tube combined with the reflector 12 and the cover 14 will actually provide more light in the desired area than the use of two conventional bulbs without the reflector 12 and cover 14. In fact, the light fixture shown in FIG. 7 saves the owner money in many ways, including but not limited to, having only one tube to replace, using less electricity, and producing less heat. All this is accomplished while the quantity of useful light is increased.

Figure 8:
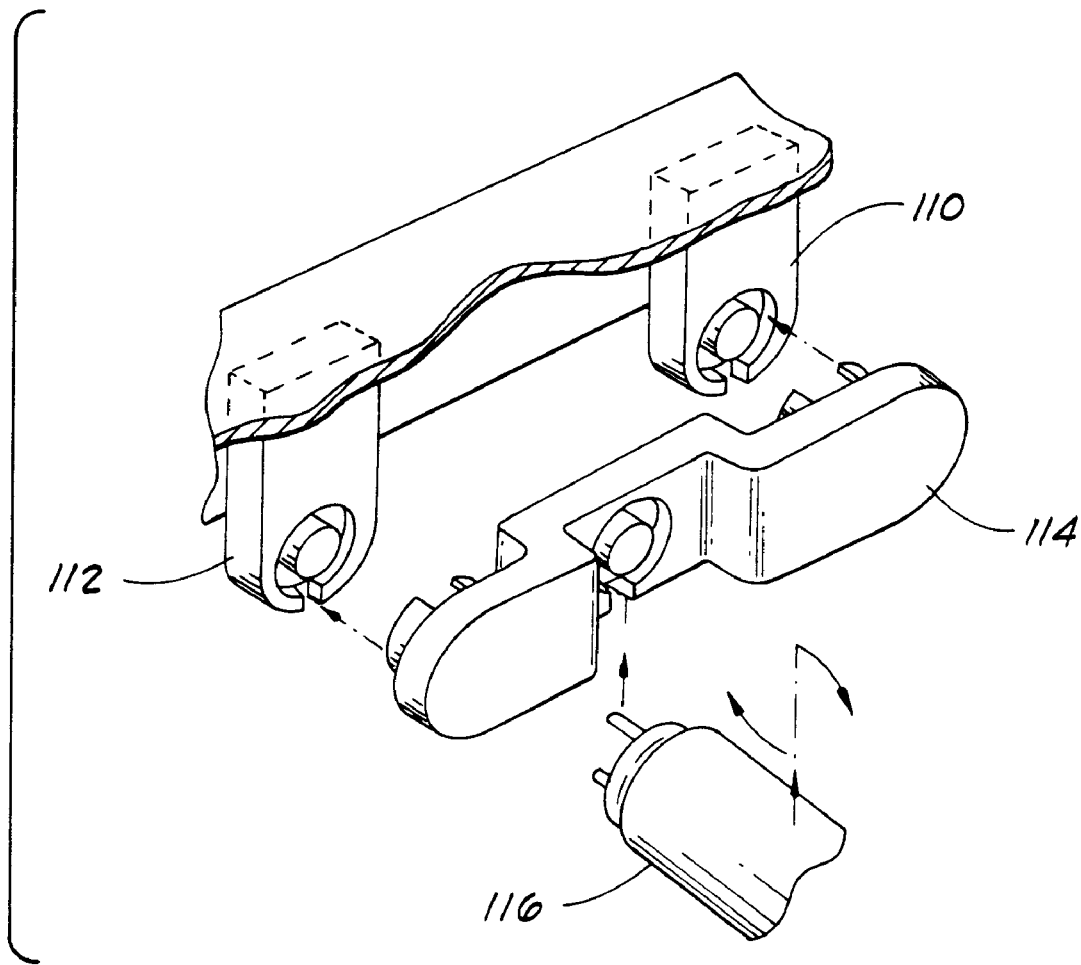
FIG. 8 is a perspective showing a bridge which may be used with the present invention.

To make the fixture of FIG. 7, one need only to assemble the components described in detail above. To convert an existing shop light such as is shown in FIG. 5 to the efficient fixture of FIG. 7, the tubes 70 and 72 are removed and the reflector 68 is removed. The reflector is usually secured to the base by screws which may be unscrewed to remove the reflector 68. Then, since the shop light 62 is designed to hold two tubes, tube connectors should be bridged to convert the fixture to a single tube fixture. An adapter may be used to bridge the tube connectors, and the ballast should be changed. Preferably an electronic ballast should be installed if the existing fixture has a less efficient magnetic ballast. A detailed discussion of how to bridge the connectors may be found in my prior U.S. Pat. No. 4,799,134 issued Jan. 17, 1989 which is specifically incorporated herein by reference. FIG. 8 shows connectors, or lamp holders 110 and 112, a bridge or adapter 114, as well as a flourescent light tube 116. The reflector is then attached to the base 66 by suitable fastening means. By way of example and not limitation, some suitable fastening means include; screws, bolts, and pop rivets. If screws are used, they may be screwed through the reflector and into the base to secure the reflector 12 to the base. The reflector should be attached so that the apex 32 of the reflector 14 is generally above where the center of the tube will be. With the reflector in place, the tube may be installed and then the cover 14 attached to the reflector 12. The cover may be attached by slightly spreading the ends 56 and 58 away from each other and then snapping the cover 14 over the reflector 12. It should also be noted one may slightly compress the reflector ends 36 and 42 toward each other to install the cover 14.

Changes may be made in the combinations, operations and arrangements of the various parts and elements, or in the procedures, steps or methods described herein without departing from the spirit and scope of the invention as defined in the following claims.

I claim:

1. A fluorescent lighting fixture of the type having at least one elongated fluorescent light tube having a length, with connector pins at opposite ends of each said fluorescent light tube, the improvement comprising:

a reflector means connected to a housing, said reflector means having a plurality of elongated reflective surfaces extending generally the length of said fluorescent light tube, each elongated reflective surface having an outer edge and a central concave surface, and wherein an apex is positioned between said concave reflective surfaces, said apex extending substantially the length of said reflective surfaces;

a plurality lamp holders, each having a body with a socket connected to the housing and each lamp holder adapted to receive the pins at one end of each of the fluorescent light tubes for electrically connecting each fluorescent light tube to a power source and for supporting said fluorescent light tube at a fixed position relative to said reflector means and generally below said apex; and a cover releasably connected to and supported by said reflector means, wherein said cover includes outer edges having inside and outside surfaces, and wherein said cover outer edges are shaped and adapted for snapping over and engaging with the outer edges of said reflective surfaces to support said cover, and wherein the outer edges of said cover include ridges formed on the inside surface thereof for engaging said outer edges of said reflective surfaces.

2. The fluorescent lighting fixture of claim 1 wherein the reflective surfaces are integrally joined at the apex.

3. The fluorescent lighting fixture of claim 1 wherein the outer edges of said cover converge toward each other to provide means for securing said cover to said reflector.

4. The fluorescent lighting fixture of claim 1 wherein the cover includes a texture integrally formed thereon.

5. A method for converting an existing low efficiency one or more fluorescent tube lighting fixture having a base and a magnetic ballast into a high efficiency fluorescent tube lighting fixture comprising:

removing the existing fluorescent tubes;

removing any existing reflector;

disconnecting the existing magnetic ballast;

connecting a new electronic ballast to the base and electrically connecting said ballast to existing bulb connectors;

bridging existing bulb connectors to form a single bulb connector;

securing a reflector means to the base, wherein said reflector means comprises: a plurality of elongated reflective surfaces extending generally the length of said lighting fixture, each elongated reflective surface having an outer edge, and a central concave surface, and wherein an apex is positioned between each pair of said concave reflective surfaces, said apex extending generally the length of said reflective surfaces; and securing a cover to said reflector means wherein said outer edge of each said reflective surface is rolled to provide structural strength to said reflector means and to provide an attachment location for said cover.

6. The method of claim 5 wherein each pair of reflective surfaces are integrally joined at said apex.

7. A method for converting an existing low efficiency one or more fluorescent tube lighting fixture having a base and a magnetic ballast into a high efficiency fluorescent tube lighting fixture comprising:

removing the existing fluorescent tubes;

removing any existing reflector;

disconnecting the existing magnetic ballast;

connecting a new electronic ballast to the base and electrically connecting said ballast to existing bulb connectors;

bridging existing bulb connectors to form a single bulb connector;

securing a reflector means to the base, wherein said reflector means comprises: a plurality of elongated reflective surfaces extending generally the length of said lighting fixture, each elongated reflective surface having an outer edge, and a central concave surface, and wherein an apex is positioned between each pair of said concave reflective surfaces, said apex extending generally the length of said reflective surfaces; and securing a cover to said reflector means, wherein said cover includes outer edges having inside and outside surfaces, and wherein said cover's outer edges are shaped and adapted for snapping over and engaging with the outer edges of said reflective surfaces to support said cover.

8. The method of claim 7 wherein the outer edges of said cover include ridges formed on the inside surface thereof for engaging said outer edges of said reflective surfaces.

9. The method of claim 7 wherein the outer edges of said cover converge toward each other to provide means for securing said cover to said reflector.

10. The method of claim 5 wherein the cover includes a texture integrally formed thereon.

* * * * *